(12) United States Patent
Harris et al.

(10) Patent No.: US 7,640,504 B2
(45) Date of Patent: Dec. 29, 2009

(54) METHOD AND SYSTEM FOR EXPORTING MENU OBJECTS TO A PERIPHERAL USING A DIRECT DATA ENTRY STRUCTURE

(75) Inventors: Martin D. Harris, Rocklin, CA (US);
Laurent P. H. Pizot, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1293 days.

(21) Appl. No.: 10/127,242

(22) Filed: Apr. 22, 2002

(65) Prior Publication Data

US 2003/0197741 A1 Oct. 23, 2003

(51) Int. Cl.
*G06F 3/00* (2006.01)

(52) U.S. Cl. .................. 715/744; 715/825; 715/826; 710/9

(58) Field of Classification Search .................. 715/810, 715/735, 744–747, 825, 826, 828; 710/8, 710/9, 18, 62, 64, 73, 101, 102, 129, 305
See application file for complete search history.

(56) References Cited

U.S. PATENT DOCUMENTS

| | | | |
|---|---|---|---|
| 6,173,316 B1 * | 1/2001 | De Boor et al. ............. 709/218 |
| 6,195,667 B1 * | 2/2001 | Duga et al. ................. 715/513 |
| 6,275,853 B1 * | 8/2001 | Beser et al. ................. 709/223 |
| 6,292,271 B1 * | 9/2001 | Phan .......................... 358/440 |
| 6,334,157 B1 * | 12/2001 | Oppermann et al. ........ 719/310 |
| 6,421,661 B1 * | 7/2002 | Doan et al. .................... 707/3 |
| 6,452,947 B1 * | 9/2002 | Kojima et al. ............... 370/493 |
| 6,457,060 B1 * | 9/2002 | Martin et al. ............... 709/245 |
| 6,509,913 B2 * | 1/2003 | Martin et al. ............... 715/762 |
| 6,578,000 B1 * | 6/2003 | Dodrill et al. .............. 704/270 |
| 6,658,419 B2 * | 12/2003 | Pasquali ..................... 707/10 |
| 6,816,864 B2 * | 11/2004 | Deuser et al. .............. 707/100 |
| 6,983,421 B1 * | 1/2006 | Lahti et al. ................. 715/763 |
| 7,024,473 B2 * | 4/2006 | Parent ........................ 709/223 |
| 7,069,271 B1 * | 6/2006 | Fadel et al. ................. 707/102 |
| 2002/0054152 A1 * | 5/2002 | Palaniappan et al. ........ 345/810 |
| 2002/0085020 A1 * | 7/2002 | Carroll, Jr. .................. 345/700 |
| 2002/0129096 A1 * | 9/2002 | Mansour et al. ............. 709/203 |
| 2002/0160790 A1 * | 10/2002 | Schwartz et al. ............ 455/456 |
| 2004/0034853 A1 * | 2/2004 | Gibbons et al. ............. 717/174 |

(Continued)

OTHER PUBLICATIONS

P. LeHegaret, "Koala Object Markup Language, Technical Notes", Online, Dec. 18, 1999, pp. 1-3, XP002287811. Retrieved from the Internet URL:http://koala.ilog.fr/koml/komltech.html. Retrieved on Jul. 9, 2004, pp. 1-2.

Digital Cellular Telecommunications System (Phase 2+); Specification of the SIM Application Toolkit for the Subscriber Identity Module—Mobile Equipment (SIME) Interface; GSM Global System; GSM 11.14 version 8.2.0 Release 1999; ETSI TS 1001267 V8.2.0 (May 2000); France.

*Primary Examiner*—Ba Huynh

(57) ABSTRACT

A method and system for exporting menu objects to a peripheral, which includes the steps of collecting configuration data of the current setting, creating a Direct Data Entry menu of pages and elements, storing the configuration data into the Direct Data Entry menu, and sending a Direct Data Entry string for a requested element in the Direct Data Entry menu.

16 Claims, 10 Drawing Sheets

U.S. PATENT DOCUMENTS

| | | | |
|---|---|---|---|
| 2004/0061713 A1* | 4/2004 | Jennings | 345/700 |
| 2004/0199574 A1* | 10/2004 | Franco et al. | 709/201 |
| 2004/0226051 A1* | 11/2004 | Carney et al. | 725/135 |
| 2005/0044524 A1* | 2/2005 | Murray et al. | 717/101 |
| 2005/0071314 A1* | 3/2005 | Caron | 707/1 |
| 2005/0216060 A1* | 9/2005 | McCarty | 606/236 |
| 2006/0015847 A1* | 1/2006 | Carroll, Jr. | 717/109 |
| 2006/0168282 A1* | 7/2006 | Turner et al. | 709/230 |

* cited by examiner

```
Card: output=[id=0x01, label="HOST NAME", type=user, value="stargate", max-length=32, allow="-
0123456789ABCDEFGHIJKLMNOPQRSTUVWXYZ_abcdefghijklmnopqrstuvwxyz", vis=1, access=1, focus=1]
```

```
Card: output=[title="TCP/IP", elements=4]
Card: output=[id=0x01, label="HOST NAME", type=user, value="stargate", max-length=32, allow="-
0123456789ABCDEFGHIJKLMNOPQRSTUVWXYZ_abcdefghijklmnopqrstuvwxyz", vis=1, access=1, focus=1]
Card: output=[id=0x02, label="IP ADDRESS", type=ipaddr, value=15.29.46.14, vis=1, access=1]
Card: output=[id=0x03, label="SUBNET MASK", type=ipaddr, value=255.255.248.0, vis=1, access=1]
Card: output=[id=0x04, label="DEFAULT GATEWAY", type=ipaddr, value=15.29.40.1, vis=1, access=1]
```

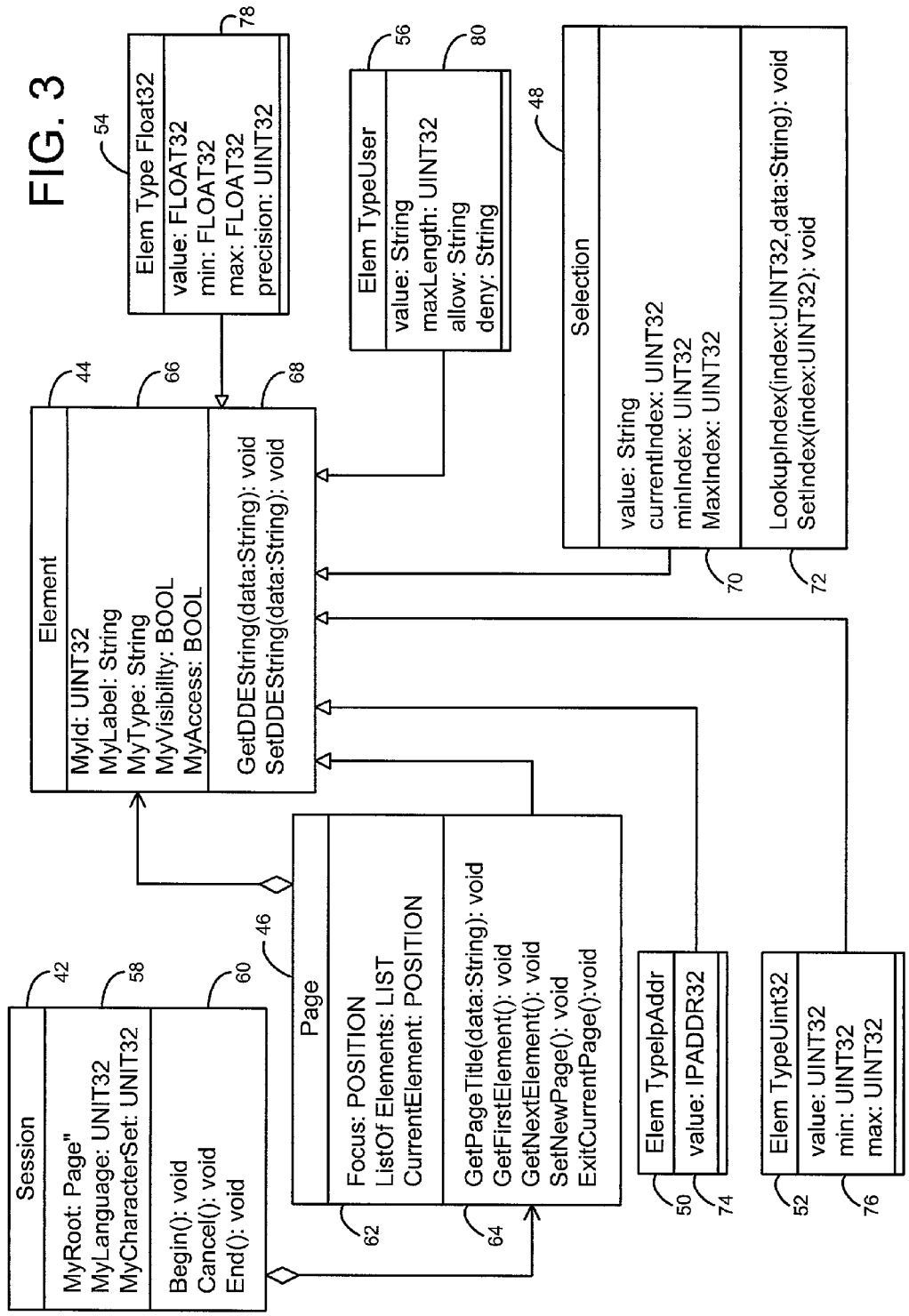

```
Menu Structure

MENU:ROOT
Title "NETWORK SETTINGS"
id=0x01 TCP/IP 
id=0x02 IPX/SPX 
id=0x03 APPLETALK 
id=0x04 RESTORE DEFAULTS <selection>

MENU:ROOT:PAGE 0x01
Title "TCP/IP"
id=0x01 HOST NAME <user text>
id=0x02 IP ADDRESS <ipaddr>
id=0x03 SUBNET MASK <ipaddr>
id=0x04 DEFAULT GATEWAY <ipaddr>
```

FIG. 7A

```
A-Set first page of menu session
Card: command MOD_SET_FIRST_PAGE
Card: input=[]
Card: output=[]
```

FIG. 7B

```
B-Page-load method (load first page)
X
Card: command MOD_GET_PAGE_TITLE
Card: input=[]
Card: output=[title="NETWORK SETTINGS", elements=4, root=1]
X
Card: command MOD_GET_FIRST_ELEMENT
Card: input=[]
Card: output=[id=0x01, label="TCP/IP", type=page, vis=1, access=1,
focus=1]
X
Card: command MOD_GET_NEXT_ELEMENT
Card: input=[]
Card: output=[id=0x02, label="IPX/SPX", type=page, vis=1, access=1]
X
Card: command MOD_GET_NEXT_ELEMENT
Card: input=[]
Card: output=[id=0x03, label="APPLETALK", type=page, vis=1,
access=1]
X
Card: command MOD_GET_NEXT_ELEMENT
Card: input=[]
Card: output=[id=0x04, label="RESTORE DEFAULTS",
type=selection, value="NO", index=1, min=0, max=1, vis=1,
access=1]
X
Card: command MOD_LOOKUP_SELECTION
Card: input=[id=0x04, index=0]
Card: output=[id=0x04, index=0, value="YES"]
X
Card: command MOD_LOOKUP_SELECTION
Card: input=[id=0x04, index=1]
Card: output=[id=0x04, index=1, value="NO"]
```

FIG. 7C

C-Page-change method (enter TCP/IP page)
X
Card: command MOD_SET_NEW_PAGE
Card: input=[id=0x01]
Card: output=[]

FIG. 7D

D-Page-load method (load TCP/IP page)
X
Card: command MOD_GET_PAGE_TITLE
Card: input=[]
Card: output=[title="TCP/IP", elements=4]
X
Card: command MOD_GET_FIRST_ELEMENT
Card: input=[]
Card: output=[id=0x01, label="HOST NAME", type=user, value="", max-length=32, allow="-0123456789ABCDEFGHIJKLMNOPQRSTUVWXYZ_abcdefghijklmnopqrstuvwxyz", vis=1, access=1, focus=1]
X
Card: command MOD_GET_NEXT_ELEMENT
Card: input=[]
Card: output=[id=0x02, label="IP ADDRESS", type=ipaddr, value=15.29.46.14, vis=1, access=1]
X
Card: command MOD_GET_NEXT_ELEMENT
Card: input=[]
Card: output=[id=0x03, label="SUBNET MASK", type=ipaddr, value=255.255.248.0, vis=1, access=1]
X
Card: command MOD_GET_NEXT_ELEMENT
Card: input=[]
Card: output=[id=0x04, label="DEFAULT GATEWAY", type=ipaddr, value=15.29.40.1, vis=1, access=1]
X

FIG. 7E

```
E-Set item (set HOST NAME item)
X
Card: command MOD_SET_ITEM
Card: input=[id=0x01, value="stargate"]
Card: output=[]
```
— 194

FIG. 7F

```
F-Page-change method (exit TCP/IP page)
X
Card: command MOD_EXIT_PAGE
Card: input=[]
Card: output=[]
```
— 196

FIG. 7G

```
G-Set selection (set RESTORE DEFAULTS selection to YES choice
at index 0)
X
Card: command MOD_SET_SELECTION
Card: input=[id=0x04, index=0]
Card: output=[]
```
— 198

FIG. 7H

METHOD AND SYSTEM FOR EXPORTING MENU OBJECTS TO A PERIPHERAL USING A DIRECT DATA ENTRY STRUCTURE

FIELD OF THE INVENTION

The present invention generally concerns an exporting method for displaying a menu in a peripheral. The method of the invention more specifically concerns exporting methods using a direct data entry structure.

BACKGROUND OF THE INVENTION

Typically, using an input and output device, such as an input and output "I/O" card (herein "card"), data can be exported to a peripheral for display to users. The card generally includes a microprocessor for processing any commands from the peripheral, memory (i.e. a computer storage medium or computer-readable medium) for storing the processes and data and an interface for communicating with the peripheral. The most common data displayed to the user is configuration data, such as a setting for the default paper size, relating to the peripheral.

However, in prior methods, the card could send only text strings, which are then displayed to the user by the peripheral. A string is a sequence of data values (e.g., bytes), which typically stand for characters (e.g., a "character string"). The mapping between values and characters is determined by the character set which is itself specified implicitly or explicitly by the environment in which the string is being interpreted. Because the strings in the prior method are limited to user readable text, the menu display and flexibility is greatly limited. In addition, since the peripheral is generally adapted to send only incremental commands, only one entry can be displayed at one time. As peripherals play a greater role in networking, it is becoming more common for the peripherals to be implemented with a server, resulting in a very long and complicated configuration menu. A typical menu would involve multiple pages, sections, subsections, and choices. With the limited use of text strings and incremental commands, the peripheral cannot display such complex menu without being a tedious task for the user, since only one entry can be displayed at a time. Furthermore, it would be difficult for the peripheral to recognize any menu structures that may be divided into pages, sections and subsection.

BRIEF SUMMARY OF THE INVENTION

In the present invention, the configuration data of a current setting of a peripheral is first collected, and a Direct Data Entry menu of the pages and elements is then created. The configuration data is stored into the created Direct Data Entry menu. Upon a request for an element in the menu, the Direct Data Entry string for the requested element is then sent.

DESCRIPTION OF THE DRAWINGS

FIGS. 2A and 2B show a general data structure and an exemplary data structure of the Direct Data Entry according to an embodiment of the present invention;

FIG. 3 shows a Direct Data Entry structure according to an embodiment of the present invention;

DETAILED DESCRIPTION

The present invention provides a way to display complicated menu structures on peripherals, which are generally limited to text strings. With the use of a Direct Data Entry ("DDE") structure, the peripheral is able to recognize a page, section, subsection or items. Users can easily navigate through the menu using the display panel on the peripheral. For example, users can navigate from a page with many sections (e.g., opens up to more choices) and items (e.g., selectable for configuration), and from a particular section with multiple subsections and items.

In the present invention, the configuration data of the current setting of a peripheral is first collected, and a Direct Data Entry menu of the pages and elements is then created. The configuration data is stored into the created Direct Data Entry menu. Upon a request for an element in the menu, a Direct Data Entry string for the requested element is then sent.

Figure 1:
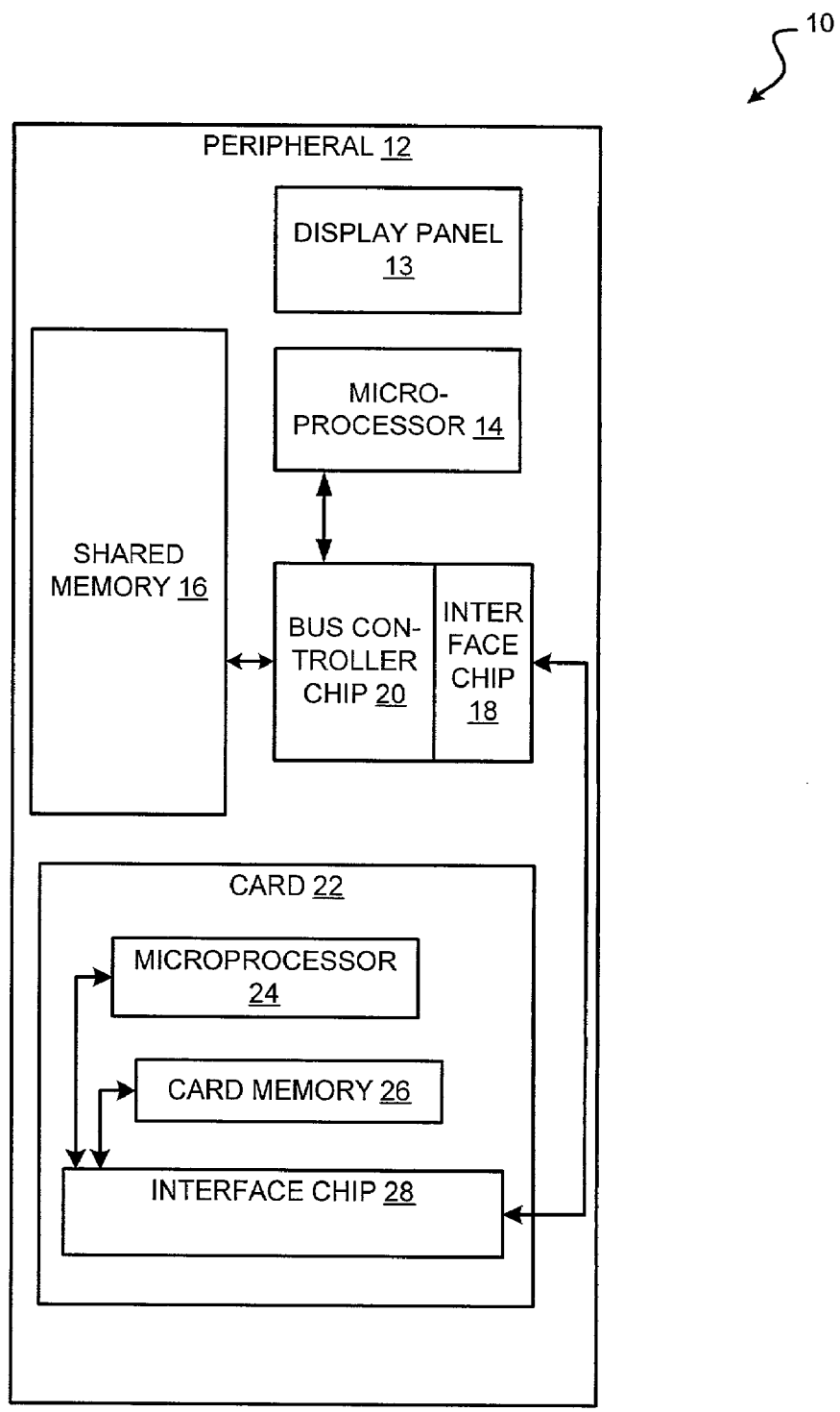
FIG. 1 shows a block diagram of a system organized to implement an embodiment of the invention.

A block diagram of a system according to an embodiment of the present invention is shown in FIG. 1, and indicated generally at 10. As with most typical systems, there is a peripheral 12 that generally includes a display panel 13 for displaying data to users, microprocessor 14 for processing data, a shared memory 16 for storing data, an interface chip 18 for communication with other devices, and a bus controller chip 20 for controlling the processing among the microprocessor. In this embodiment, a card 22 is used as an input and output device for communicating with the peripheral 12. Similarly, the card includes a microprocessor 24 for processing, memory 26 (i.e. a computer storage medium or computer-readable medium) for storing data and program codes of processes executable by microprocessor 24, and an interface chip 28 for communicating with the peripheral. The card is a separate component (i.e., external) from the peripheral. For example, the card can be inserted or extracted easily to and from the peripheral. However, the present invention also contemplates using the card or any input or output device that is internal to the peripheral. Thus, it should be understood that these various implementations are within the scope of the present invention.

In this embodiment, the card 22 stores the configuration data, such as menu objects of a menu, for display on the peripheral 12. With the use of a display 13 on the peripheral, the card exports the menu to the user for configuration set up or revision. In this embodiment, the card 22 monitors and controls the navigation of a user session for configuring the menu. However, implementations of the peripheral monitoring and controlling the navigation are also contemplated, and these various implementations are within the scope of the present invention.

The present invention may be implemented in a variety of systems. The current embodiment uses a card as one of the many implementation variations. The present invention, nonetheless, can be implemented on any device that has the capability to store and process information. However, it should also be understood that the present invention can be implemented in various computer codes, such as machine codes, and firmware.

In addition, the present invention can be implemented with different types of data structures, such as a tree. As a result, it should be understood that others skilled in the art can appreciate the implementations of the various systems and configurations, and these implementations are within the scope of the present invention. However, a page object-oriented data structure is used as the data structure according to one embodiment, and the present invention will be explained and described with a page object-oriented data structure implementation as the data structure.

A general data structure 30 and an exemplary data structure 32 of a Direct Data Entry string according to an embodiment of the present invention are shown in FIGS. 2A and 2B. In the current embodiment, a Direct Data Entry ("DDE") string of an element is generated by the card 22 in response to commands sent from the peripheral 12. An element is defined as one of the items of data in an array (i.e., a collection of similarly typed data items distinguished by their indices or subscripts). In the present DDE data structure, an element can be a page, a selection and an item, and this is dependent on what type the element is defined as. In the current embodiment, elements are used to define menu objects (e.g., page, a selection and an item) in a menu with a specific structure, and the DDE string defines the configuration of the elements, which includes multiple attributes. An attribute is used as a named value or relationship that exists for some or all instances of some entity and is directly associated with that instance. The peripheral, using these attributes, displays the menu objects according to their appropriate structure.

In this embodiment, there is a type attribute (e.g., type=user) for defining a type for the element and an identification attribute for uniquely identifying the element in a page. Although the identification attribute is defined as "id=0x01", the "0x0" does not necessarily indicate any specific order or structure of the menu. Thus, for example, the identification attribute of "id=0x860020" would have also worked with the current implementation. It should be understood that any numbering of the identification attribute could have been chosen, depending on the implementation. As a result of the type attribute and the identification attribute, the menu objects (e.g., elements) are displayed according to their structure in a given menu. For example, a type attribute can be used to define a page (e.g., type=page), a host name (e.g., type=user), information relating to the network address of the peripheral (e.g., type=ipaddr), a selection defined by the user (e.g., type=selection), or any thing that may be appropriate to define menu objects in the menu structure.

There are also other attributes, such as an element count attribute for defining the total number of elements for a page, a value attribute for indicating a value for the element, a title attribute for defining a title for the element, a label attribute for defining a description of the element, a vis attribute for indicating whether the element is visible and operational, and an access attribute for indicating the users' right to view or modify the element. Although not all the attributes have been shown in this example, a skilled artisan would appreciate that various attributes can be added, altered or deleted depending on the implementation. The various implementations with the use of different attributes are contemplated, and they are within the scope of the present invention.

As shown in the examples shown in FIG. 2B, the element entitled "TCP/IP" (e.g., title="TCP/IP") has a total of four elements (e.g., elements=4). The first element under "TCP/IP", which is a host name (e.g., label="HOST NAME") of "stargate" (e.g., value="stargate"), an identification attribute of "id=0x01" is used as an association to an element in the page. As shown, there may be other attributes, such as max-length attribute for defining the maximum length allowed for the value attribute, an allow attribute for indicating the allowed characters for the value attribute, a focus attribute for defining a previously selected element, as well as the vis attribute for indicating whether the element is visible and operational and an access attribute for indicating the users' right to view or modify the element. A typical menu structure of the element "TCP/IP" has been shown, which includes a host name, an IP address, a subnet mask and a default gateway.

A Direct Data Entry structure according to an embodiment of the present invention is shown in FIG. 3 and indicated generally at 40. The overall data structure is divided into a Session group 42, an Element group 44, a Page group 46 and a Selection group 48. The remaining groups of Elem TypeIpAddr 50, Elem TypeUint32 52, Elem Type Float32 54 and Elem TypeUser 56 are used to define the allowed configuration of elements of a specific type. Under each of the groups, the attribute and the commands are shown.

For example, session 42 includes attributes 58 of "–MyRoot: Page" for defining the root page as the first page, "MyLanguage: UNIT 32" for defining the default language and "MyCharacterSet: UNIT32" for defining the character and commands 60 of "Begin( ): void" for beginning the session, "Cancel( ): void" for canceling the session and "End( )" for ending the session. Page group 46, on the other hand, includes attributes 62 of "Focus: POSITION" for defining a previously selected element, "ListOf Elements: LIST" for defining the number of elements in the page and "CurrentElement: POSITION" for defining the current element being processed and commands 64 of "GetPageTitle(data:String): void" for getting the title of the page, "GetFirstElement( ): void" for getting the first element in the page, "GetNextElement( ): void" for getting the next element in the page, "SetNewPage( ): void" for setting a new page and "ExitCurrentPage( ):void" for exiting the current page.

The attributes 66 (e.g., "MyId: UINT32", "MyLabel: String", "MyType: String", "MyVisibillty: BOOL" and "MyAccess: BOOL") and commands 68 (e.g., "GetDDEString(data:String): void" for getting the DDE String" and "SetDDEString(data:String): void" for setting the DDE String) of the group element 44 are then used as a current element of the current page from the Page group 46. Lastly, a selection group 48 is included for allowing the user to select elements from the menu. The selection group 48, similarly, includes a different set of attributes 70 (e.g., "value: String", "currentIndex: UINT32", "minIndex: UINT32" and "MaxIndex: UINT32") and commands 72 (e.g., "LookupIndex(index:UINT32,data:String):void" and "SetIndex(index: UINT32): void" for looking up and setting the identification attribute of the selected element).

Because the group "Elem TypeIpAddr" 50, "Elem TypeUint32" 52, "Elem Type Float32" 54 and "Elem TypeUser" 56 are used to define the allowed configuration of elements of a specific type, they do not have any commands in the current embodiment. Rather, these elements inherent commands from their base class (e.g., group elements). Put differently, these elements are a specific instance(s) of the group element. "Elem TypeIpAddr" 50 includes an attribute 74 of "value: IPADDR32" for defining the value of elements having IP Address as type (e.g., type=ipaddr), and "Elem TypeUint32" 52 includes attributes 76 "value: UINT32", "min: UINT32" and "max: UINT32" for defining the value of elements having an unassigned integer as type. Finally, "Elem Type Float32" 54 and "Elem TypeUser" 56 includes similar attributes 78 (e.g., "value: FLOAT32", "min: FLOAT32", "–max: FLOAT32" and "precision: UINT32"), 80 (e.g., "value:

String", "maxLength: UINT32", "allow: String" and "deny: String"). Again, a skilled artisan would appreciate the flexibility in the implementation of the present invention, and it should be understood that the groups, attributes and/or commands may be changed. These various implementations are within the scope of the present invention.

Figure 4:
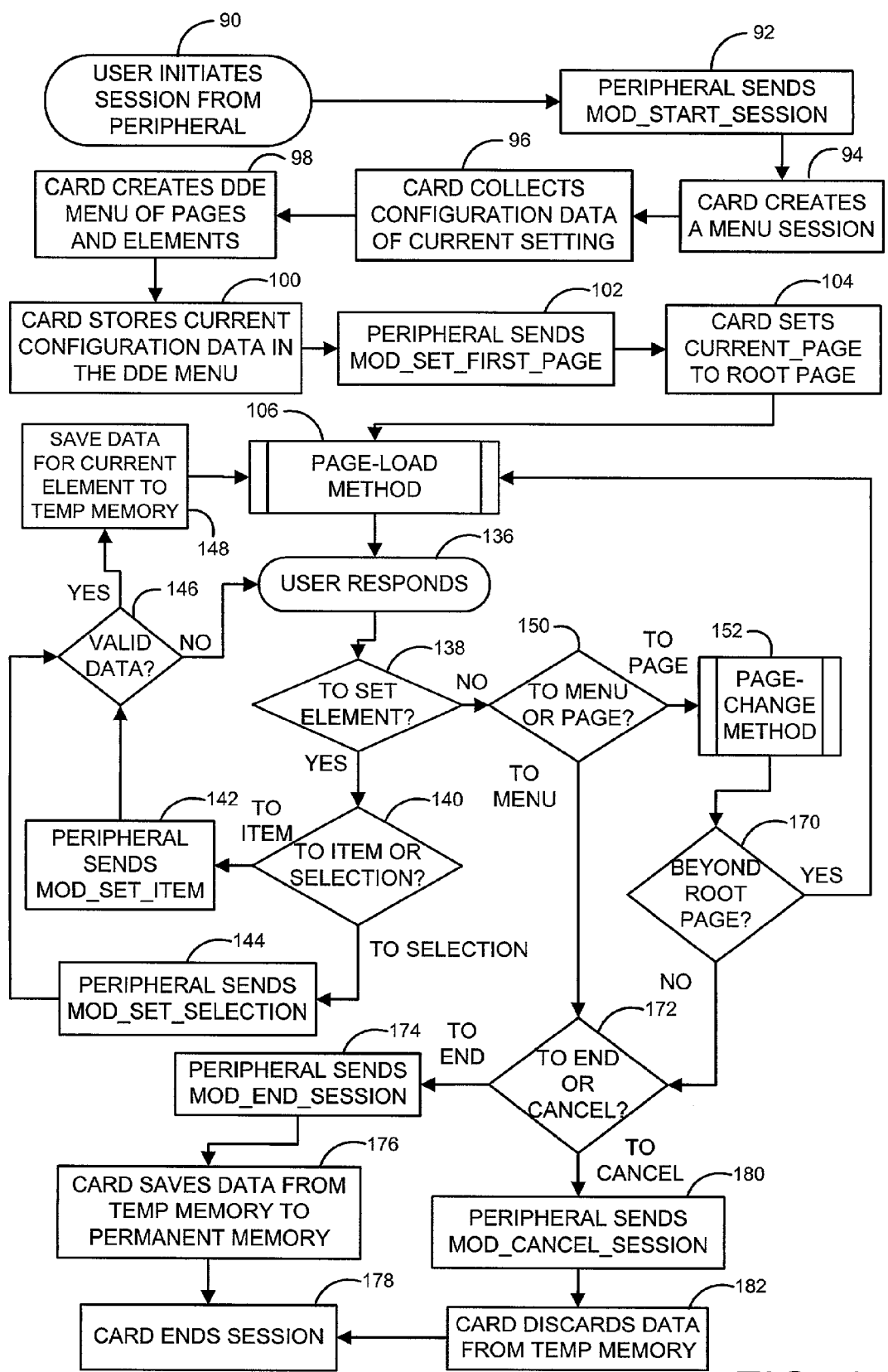
FIG. 4 is a flow chart according to an embodiment of the present invention illustrating the functionality of a method of the present invention.

One embodiment of a method for exporting menu objects of a menu to the peripheral 12 in accordance with the invention is shown in FIG. 4. The method is initiated by a user, through the peripheral 12, by calling a command to start a menu session (block 90), and the peripheral accordingly sends a Mod_Start_Session command to the card (block 92). However, it should be noted that automatic initiation by a computer program is also contemplated, depending on the design and needs of the implementation. The card then creates a menu session on the display panel of the peripheral (block 94) and collects the configuration data of the current setting for the peripheral (block 96). In the current embodiment, the configuration is stored on the card, but the configuration data can also be stored on the peripheral.

Once the card finishes collecting the configuration data (block 96), a DDE menu of the pages and elements is created (block 98) and stored with the current configuration data (block 100). The peripheral sends a Mod_Set_First_Page command to set the first page (block 102), and, in response, the card sets the root page as the current_page (block 104). After the root page is set as the current page (block 104), the page-load process is initiated for loading the currently set page (block 106), which is shown in FIG. 5.

Figure 5:
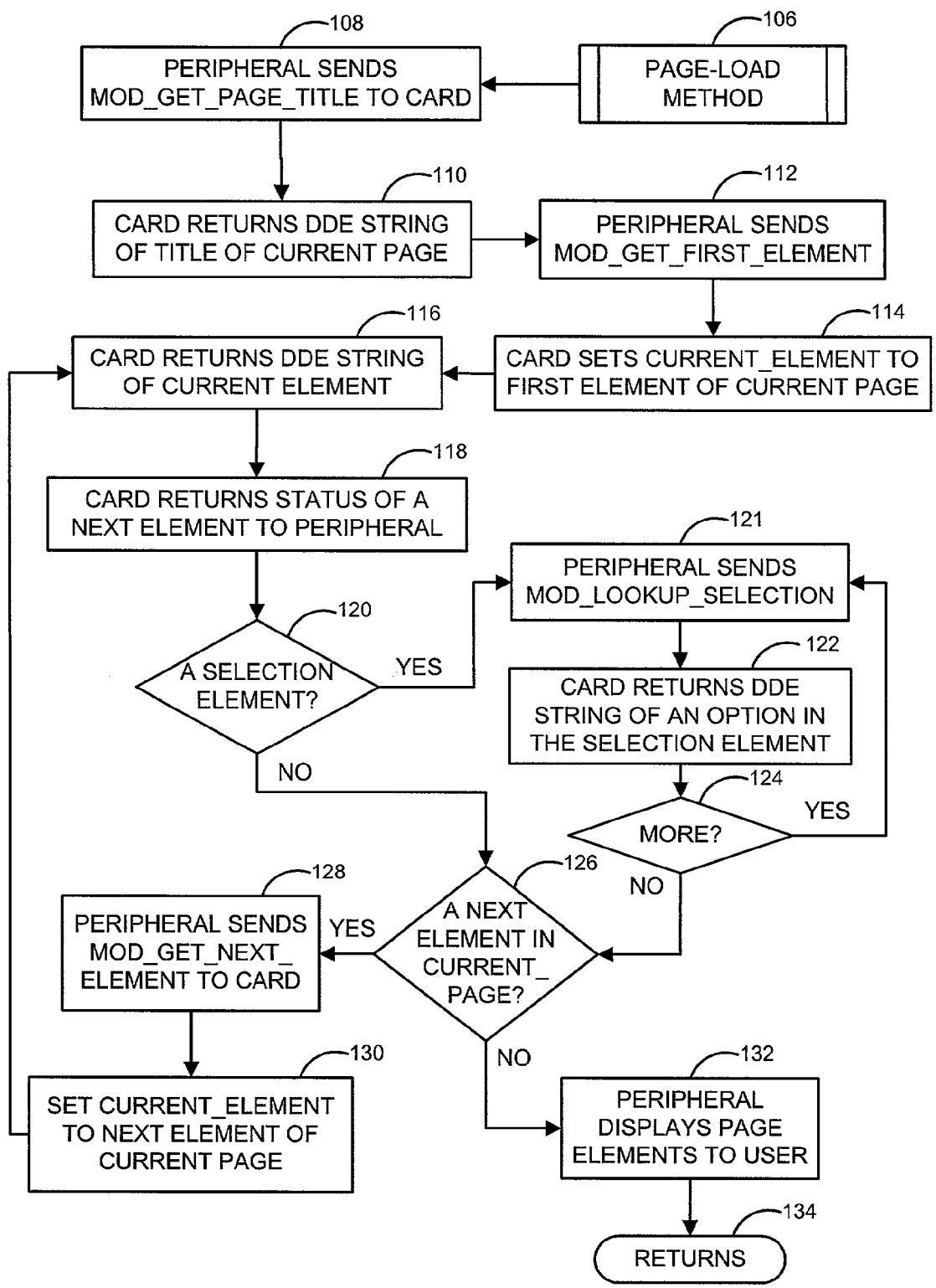
FIG. 5 is a flow chart according to an embodiment of the present invention illustrating the functionality of a page-load method shown in FIG. 4.

Turning now to the page-load process (block 106) shown in FIG. 5, for the current_page (e.g., the root page), the peripheral first sends a Mod_Get_Page_Title to the card for getting the title of the current page (block 108). In response, the card returns a DDE string of the title of the current page (block 110). From which, the peripheral sends a Mod_Get_First_Element command to get the first element of the current page (block 112). The card accordingly sets the first element in the current page as the current_element (block 114), and returns the DDE string of the current element (block 116). In preparation for the next element in the current page, the card returns a status of a next element of the current page to the peripheral (block 118).

It is then determined whether there is a selection element requested (block 120). If so, the peripheral sends a Mod_Lookup_Selection command to request that an option in a selection element be returned by the card (block 121). As requested, the card returns a DDE string of the selection element to the peripheral (block 122). It is next determined whether there are more options in the selection element (block 124). If there is another option (block 124), the process reloops to the step of the peripheral sending the Mod_Lookup_Selection command for another request (Block 120). This subroutine is repeated until there are no more options in the selection element (block 124). Once it is either determined that there is not a selection element (block 120) or there are no more options for the selection element (block 124), the page-load process then determines whether there is a next element in the current page (block 126). When there is a next element (block 126), the peripheral sends a Mod_Get_Next_Element command to get the next element for the current page (block 128). The card, in response, sets this next element as the current_element (block 130) and reloops to the step of returning the DDE string of the current element (block 116). The page-load method is restarted from this step. If, on the other hand, there is not a next element (block 126), the peripheral displays the page elements with the returned DDE string to the user (block 132) and returns to the method shown in FIG. 4 (block 134).

Referring back to FIG. 4, after the elements of the current page are displayed to the user (block 132), a response is expected from the user (block 136). Once the user responds, it is determined whether the user's response is to set an element in the current page (block 138). If so, it is then determined whether the element is an item or a selection selected by the user (block 140). If the element is an item, the peripheral sends a Mod_Set_Item command for setting the item (block 142). Similarly, if the element is a selection, the peripheral sends a Mod_Set_Selection command for setting the user selection (block 144). Once the element has been set, it is determined whether the data sent to set the element is valid (block 146). If so, according to the current embodiment, the data for the current element is saved to the temporary memory (block 148). If the data fails the validity test (block 146), the process simply waits until there is another user response (block 136).

Upon a response from the user, the process loops back to the step of determining whether the user response is to set an element in the current page (block 138). If the user response is to set an element, the process repeats. However, if the user response is not to set an element, it is then determined whether the user response is to go to the menu or a page in the menu (block 150). If the user response is to go to a page, a page-change method (block 152) shown in FIG. 6 is initiated to make such a page change.

Figure 6:
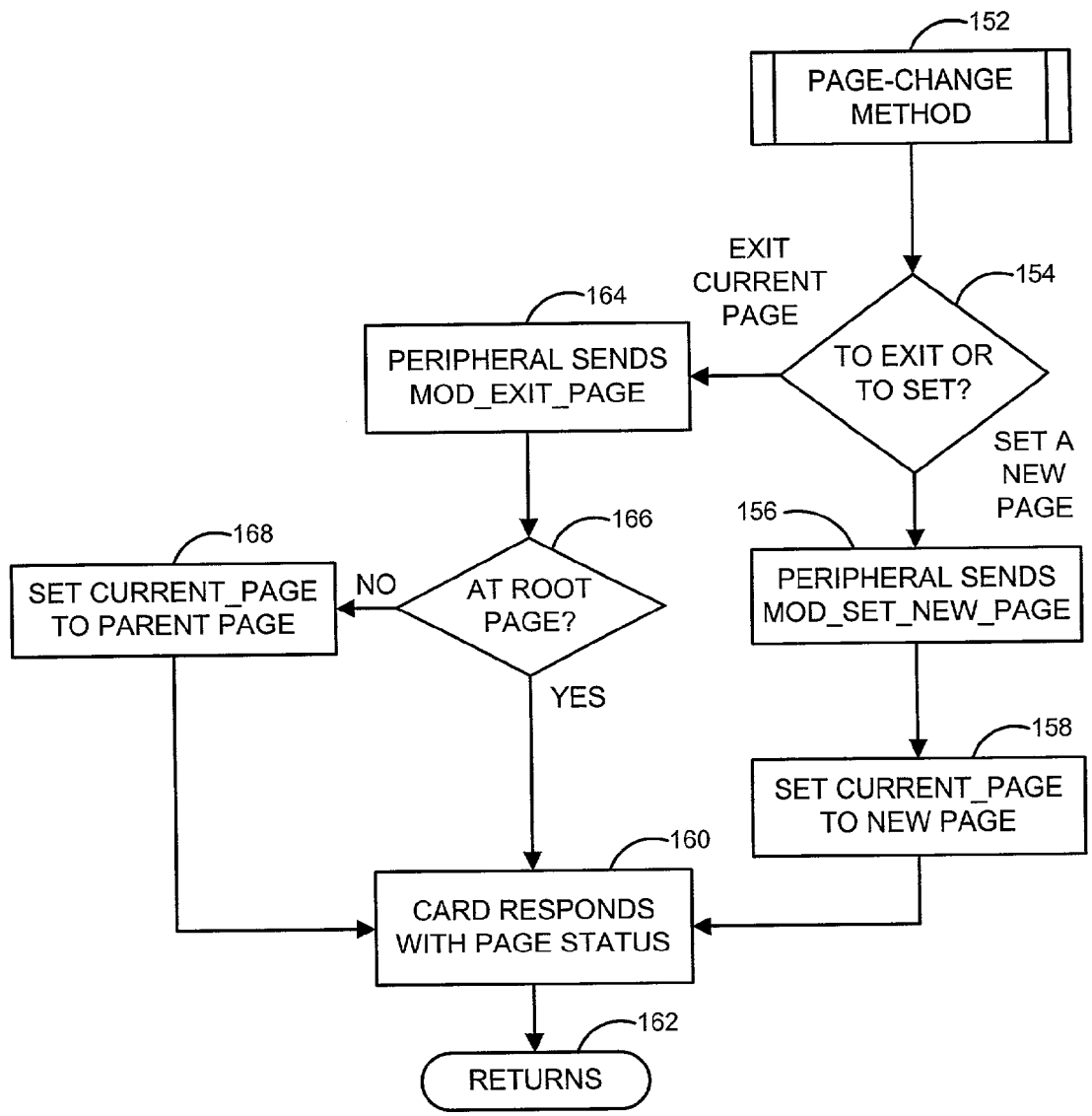
FIG. 6 is a flow chart according to an embodiment of the present invention illustrating the functionality of a page-change method shown in FIG. 4; and, FIGS. 7A, 7B, 7C, 7D, 7E, 7F, 7G and 7H show exemplary inputs and outputs given a defined menu structure.

Turning now to the page-change method (block 152) shown in FIG. 6, it is determined whether the user response is to exit the current page or to set a new page (block 154). If the user response is to set a new page, the peripheral sends a Mod_Set_New_Page command to request that a new page be set (block 156), which is followed by the card setting the new page as the current_page (block 158). In addition, the card responds with a page status of this change to the peripheral (block 160). The page-change method ends and returns (block 162) to the method shown in FIG. 4. If, however, the user response is to exit the current page without indicating a new page (block 154), the peripheral would send a Mod_Exit_Page command to the card to make such a request (block 164). The card then determines whether the current page is the root page (block 166). If so, the card simply responds with a status of the current page being the root page to the peripheral (block 160) and returns back to the method shown in FIG. 4. However, if the current page is not the root page, the card sets the current_page to a parent page of the page being requested for exit (block 168), and, again, the card sends a page status of the current page (block 160) and returns to method shown in FIG. 4 (block 162), and the page-change method ends at this point.

Referring again to FIG. 4, after the page-change method is finished processing and returns with a page status of the current_page (block 152), it is determined whether the current_page is beyond the root page (block 170). Put differently, it is determined whether the currently set current_page is past the root page (block 170). If the current_page is not beyond the root page (block 170), the process reloops to the page-load method (block 106), which is again initiated with the currently set current_page.

If, on the other hand, the current_page is beyond the root page (block 170) or the earlier sent user response is to go back to the menu (block 150), it is next determined whether there is a request to end or cancel the session altogether (block 172). If a request to end the session has been submitted by the user (block 172), the peripheral sends a Mod_End_Session command to the card for ending the session (block 174). In response, the card saves the data from the temporary memory to the permanent memory (block 176) and the session is ended (block 178). However, if it has been requested to cancel the session (block 172), the peripheral sends a Mod_Cancel_Session command to the card (block 180). In response to the command, the card discards the data from the temporary memory (block 182) and ends the session (block 178).

Exemplary inputs and outputs given a defined menu structure is shown in FIGS. 7A, 7B, 7C, 7D, 7E, 7F, 7G and 7H. Turning to FIG. 7A, an overall menu structure of the root page along with a specific example of the "TCP/IP" page under the root page is shown and indicated generally at 184. Under the root page entitled, "NETWORK SETTINGS," there are 4 elements, specifically a TCP/IP page element, a IPX/SPX page element, a APPLETALK page element and a RESTORE DEFAULTS selection element. In the example, only the TCP/IP page element is shown, and it has 4 other elements under the TCP/IP page element, which are HOST NAME, IP ADDRESS, SUBNET MASK and DEFAULT GATEWAY. Note that there is an unique identification attribute (e.g., id=0x01) for uniquely identifying each element in the page. Although TCP/IP and HOST NAME has the same identification attribute (e.g., id=0x01), the identification attribute is specific to each page element.

Turning now to FIG. 7B, a trace for setting the first page of the menu session is shown and indicated generally at 186. A trace is a utility that allows developers to see a list of inputs and outputs for the processing of the commands. The card receives the Mod_Set_First_Page from the peripheral, and there is no input or output from the card, since the root page is the first page by default. Next, the card loads the currently set page, which is the root page, and the trace for loading the current page is shown in FIG. 7C.

In FIG. 7C, the trace for the page-load method is shown and indicated generally at 188. From the previous example in FIG. 7B, the first page is set as the current page being loaded, which is a root page from the example in FIG. 7A. For each command sent from the peripheral, the card outputs a DDE string for the command. For example, for the Mod_Get_Page_Title command, the card outputs the DDE string of "[title="NETWORK SETTINGS", elements=4, root=1]". The DDE string for the title is followed by each of the elements. The DDE string of the first element (e.g., TCP/IP) is returned with the Mod_Get_First_Element command. After all the elements for the current page have been returned and displayed on the peripheral, the peripheral may sent back a Mod_Lookup_Selection command if the user selects an element from the current page. In this case, the card receives the command along with an input of the identification attribute and the index attribute of the selection (e.g., input=[id=0x04, index=0]), and an output (e.g., output=[id=0x04, index=0, value="YES"]) that there is such a value is sent to the peripheral.

A trace of the page-change method with a specified page of the TCP/IP page is shown in FIG. 7D and indicated generally at 190. The card receives the Mod_Set_New_Page command along with an input identifying the requested page using the identification attribute (e.g., input=[id=0x01]) from the peripheral, the card initiates the page-load method to load the TCP/IP page element, which is shown in FIG. 7E.

A trace of the page-load method for loading the TCP/IP page element is shown in FIG. 7E and indicated generally at 192. Again, a Mod_Get_Page_Title command is received by the card, and a DDE string for the title (e.g., output=[title="TCP/IP", elements=4]) is returned to the peripheral. From the DDE string of the title, the peripheral sends the Mod_Get_First_Element command and the Mod_Get_Next_Element command to obtain the elements in the TCP/IP page from the card. As shown, the card returns the DDE string of each element shown in FIG. 7A.

With the TCP/IP page displayed, the user can set an item, change the current page or set an selection, which is shown in FIGS. 7F, 7G and 7H and indicated generally at 194, 196, 198, respectively. If the user requested to set an item in the TCP/IP page, the peripheral sends the Mod_Set_Item command with an input to identify the element and the value for the element (e.g., input=[id=0x01, value="stargate"]). In this case, the card does not output any string to the peripheral. Similarly, the page-change method shown in FIG. 7G, there is a Mod_Exit_Page, and there is no input or output to and from the card. In FIG. 7H, the user can also set a selection, which again prompts the peripheral to send the Mod_Set_Item command along with an input (e.g., input=[id=0x04, index=0]) to the card.

From the foregoing description, it should be understood that an improved system and method for exporting menu objects of a menu in a peripheral using a direct data entry structure have been shown and described, which have many desirable attributes and advantages. The system and method enables menu objects and structure to be exported to a peripheral, allowing for user selection to configure these menu objects.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

APPENDIX A

PERIPHERAL COMMANDS

| Command | Description |
| --- | --- |
| MOD_MENU_TITLE | Return the menu title in the buffer. Does not affect the card internal state. The title string must contain at least one printable character. |
| MOD_START_SESSION | A request sent by the peripheral to enter into the card's menu state machine. A null string is sent by the peripheral in the request and the card returns a null string in the response. No Indicator bits should be set in either the request or response |
| MOD_END_SESSION | A request sent by the peripheral to exit the card's menu state machine and save any modifications. A null string is sent by the peripheral in the request and the card returns a null string in the response. No Indicator bits should be set in either the request or response |
| MOD_CANCEL_SESSION | A request sent by the peripheral to exit the card's menu state machine and discard any changes. A null string is sent by the peripheral in the request and the card returns a null string in the response. No Indicator bits should be set in either the request or response |
| MOD_SET_FIRST_PAGE | A request sent by the peripheral to enter into the card's first page. A page is a logical grouping of menu elements. A null string is sent by the peripheral in the request and the card returns a null string in the response. No Indicator bits should be set in either the request or response. |
| MOD_SET_NEW_PAGE | A request sent by the peripheral to enter a new logical grouping of menu elements. A DDE string is sent by the peripheral in the request to inform the card of the desired page and the card returns a null string in the response. No Indicator bits should be set in the request. The card may set Indicator Bit 3 in the response if the requested page is invalid. |

APPENDIX A-continued

PERIPHERAL COMMANDS

| | |
|---|---|
| MOD_GET_PAGE_TITLE | A request sent by the peripheral to get the title for a page. Does not affect the card internal state. The title string must contain a least one printable character. Peripherals should issue this request when entering and exiting pages. The peripheral cannot assume the title of any previous page is still valid after performing either a MOD_SET_SELECTION or MOD_SET_ELEMENT and must issue this request after receiving responses to these requests. |
| MOD_EXIT_CURRENT_PAGE | A request sent by the peripheral to leave the current logical grouping of menu elements and return to the previous page. A null string is sent by the peripheral in the request and the card returns a null string in the response. No Indicator bits should be set in the request. If the peripheral was on the first page when this request is issued, the card will return the response with Indicator Bit 3 set. The peripheral cannot assume the elements of any previously page are still valid and the peripheral should gather all the elements of the current page after receiving the response from this request. |
| MOD_GET_FIRST_ELEMENT | A request sent by the peripheral to get the first element of the current page. A null string is sent by the peripheral in the request and the card returns a DDE string representing the element in the response. This DDE string will represent various element types including parameter/items, menus, and selections. See the appendix at the end of this document for more information concerning DDE strings. No Indicator bits should be set in the request. Indicator bit 2 will be set in the card's response verifying this is the first element on the page. If the peripheral does not have a current page when this request is issued, the card will return the response with a null string with Indicator Bit 3 set. |
| MOD_GET_NEXT_ELEMENT | A request sent by the peripheral to get the next element of the current page. A null string is sent by the peripheral in the request and the card returns a DDE string representing the element in the response. This DDE string will represent various element types including parameter/items, menus, and selections. See the appendix at the end of this document for more information concerning DDE strings. No Indicator bits should be set in the request. Indicator Bit 1 in the card's response will be set if this is the last element on the page. The list of elements on a page is not circular; the next request after the last element has been retrieved will return a response with a null string with Indicator Bit 3 set. When the first element on the page is returned Indicator bit 2 will be set in the card's response. If the peripheral does not have a current page when this request is issued, the card will return the response with a null string with Indicator Bit 3 set. |
| MOD_GET_PREV_ELEMENT | A request sent by the peripheral to get the previous element of the current page. A null string is sent by the peripheral in the request and the card returns a DDE string representing the element in the response. This DDE string will represent various element types including parameter/items, menus, and selections. See the appendix at the end of this document for more information concerning DDE strings. No Indicator bits should be set in the request. Indicator Bit 1 in the card's response will be set if this is the last element on the page. The list of elements on a page is not circular; a previous request on the fist element will return a response with a null string with indicator Bit 3 set. When the first element on the page is returned Indicator bit 2 will be set in the card's response. If the peripheral does not have a current page when this request is issued, the card will return the response with a null string with Indicator Bit 3 set. |
| MOD_SET_SELECTION | A request sent by the peripheral to set the DDE string choice for a selection. A DDE string is sent by the peripheral indicating which choice is to be set for the selection and the card returns a null string in the response. See the appendix at the end of this document for more information concerning DDE strings and selection elements. No Indicator bits should be set in the request. The card may set Indicator Bit 3 in the response if the requested choice cannot be set or is invalid. The peripheral cannot assume the elements of the current page are still valid after sending this request and the peripheral should gather all the elements of the current page after receiving the response. |
| MOD_LOOKUP_SELECTION | A request sent by the peripheral to get one of the enumerated DDE string choices for a selection. A DDE string is sent by the peripheral indicating which choice is requested and the card returns a DDE string representing this item. See the appendix at the end of this document for more information concerning DDE strings and selection elements. No Indicator bits should be set in the request. The card may set Indicator Bit 3 in the response if the requested selection element is invalid. |
| MOD_SET_ITEM | A request sent by the peripheral to set the parameter of a specified item/parameter element of the current page. A DDE string is sent by the peripheral in the request and the card returns a null string in the response. See the appendix at the end of this document for more information concerning DDE strings. No Indicator bits should be set in the request. The card may set Indicator Bit 3 in the response if the requested page is invalid. The peripheral cannot assume the elements of the current page are still valid after sending this request and the peripheral should gather all the elements of the current page after receiving the response. |
| MOD_GET_DDE_STRING | For Enhanced Menus only, see section 11.11.2 and the appendix at the end of the document for the DDE string format definition. The peripheral sends this operator as a request with a null string. The card returns the Direct Data Entry format string describing the current configuration item/parameter. The Indicator field must be set as listed below. This operator is typically issued by the peripheral when keyboard data will be entered for the parameter. |

DIRECT DATA ENTRY

| | |
|---|---|
| DDE string | id=<hex number>, label="<localized text>" type=<one of several data types>, <detailed attributes>, prefix="<localized text>", suffix="<localized text>", vis={1, 0}, access={r, w} |

The parts of a DDE string are explained below:

Identification: The id keyword is a card-supplied identifier that is unique to the current menu page. The card may reuse identifiers from page to page, but not within the same page. The identifier is a 32-bit hex number.

Label: The label keyword is followed by text that is localized in the language and character set specified by NLS Set PGP packet. The label describes the menu item. The label is surrounded by quotes and does not allow for internal quotes to be present in the string.

Type: The type keyword determines how to capture and display data to the user. The type indicates the menu item is for an integer, hexadecimal number, real number, IP address, list of selections, or user-supplied text.

Detailed Attributes: Any type-specific attributes must be placed after the identifier, label, and type attributes. For each data type there is a set of keywords that further describe rules for data capture and display for a given menu item.

Prefix and Suffix: The prefix and suffix attributes are optional. They are not required to be supported by peripherals, so card-supplied DDE strings must be sufficiently clear without them. They are primarily for displaying units before and/or after the value text.

Visibility: The vis attribute is optional. It is applicable to all data types. When set to 1, it indicates that the menu item is visible and operational. When set to 0, the menu item is not visible and is therefore non-operational. Peripherals may post an icon indicating that the current menu item is locked, or hidden. Peripherals may also omit the menu item from the menu page.

Access: The access attribute is optional. It is applicable to all data types. The access indicates the degree of access the user has to view and modify the item's value.

r—menu item can be viewed but not modified
w—menu item can be both viewed and modified

| Keywords for DDE Data Types and their Attributes | |
|---|---|
| Types: | Attributes: |
| page | { } |
| uint32 | { value, min, max, large-step, wrap, percent } |
| sint32 | { value, min, max, large-step, wrap, sign, percent } |
| ipaddr | { value } |
| selection | { value, index, min, max} |
| real32 | { value, min, max, precision, single-step, large-step, wrap, sign, percent } |
| user | { value, max-length, class \| allow \| deny } |

Sub Menus (Page)

The page keyword is used for sub menus. There are no detailed keywords. The page title (sub menu title) is contained in the label part of the DDE string. The peripheral will enter into sub menus (pages) by sending an IIO command, CMD_MENU_DATA, with the modifier, MOD_SET_NEW_PAGE, with a DDE string that contains the id of the page into which to enter.

| DDE string sent by the peripheral | id=<hex number> |
|---|---|

Unsigned Integers (uint32)

Unsigned integers are useful for positive numbers and for hexadecimal numbers, which are useful for station addresses. Peripherals that do not have alpha characters on their keypads can use incremental menu commands to process this menu item. Card designers have to be aware that peripherals may use incremental menu commands instead of direct data entry for this uint32 type.

| Keyword | Data type and printf format | Range and comments |
|---|---|---|
| Value | UINT32, "%u" e.g. value=270 | Card supplies value such that $0 <=$ value $<= 2^{32} - 1$, and min $<=$ value $<=$ max. For values greater than 100, the peripheral determines whether and how to display the radix depending on the current localization (e.g. "1000" for neutral or "1,000" for U.S. or "1.000" for Europe). |
| Min | UINT32, "%u" e.g. min=0 | Card supplies min such that $0 <=$ min $<= 2^{32} - 1$, and min $<=$ max. |
| Max | UINT32, "%u" e.g. max=360 | Card supplies max such that $0 <=$ max $<= 2^{32} - 1$, and min $<=$ max. |
| large-step | UINT32, "%u" e.g. large-step=30 | Card supplies large-step x such that $x > 0$, and $x <=$ (max-min). Peripherals use x to adjust a value up or down in large increments. Peripherals add x to the value to step up or subtract x from the value to step down. When the max or min is reached or exceeded, the peripheral determines how to wrap to a new value that still meets the criteria min $<=$ value $<=$ max. The default is large-step = 10 for all applicable data types except when using the uint32 type with hex format, for which the default is large-step = 0 × 10 (16 decimal), and the real32 type, for which the default is large-step = 10.0. |
| Wrap | UINT32, "%u" e.g. wrap=0 e.g. wrap=1 | Card supplies wrap flag such that 1 = yes to include wrap numeric values, and 0 = no to not wrap numeric values then either min or max has been reached. The default is wrap = 0 (do not wrap). Peripherals may choose to ignore this option. |
| format | UINT32, "%u" e.g. format=dec e.g. format=hex | Card supplies format as dec for decimal or hex for hexadecimal. The format determines how to capture numbers from the user and how to display numbers to the user. The default is format = dec (decimal format). This option is only supported for alphanumeric enhanced and alphanumeric flex menus. |
| percent | UINT32, "%u" e.g. percent=0 | Card supplies percent flag such that 1 = yes to include a percent symbol, and 0 = no to omit a percent symbol. The percent symbol is ASCII code 37 ("%"). This flag does not apply to the hex format type. The default is percent = 0 (no percent symbol). Peripherals may choose to ignore this option. |

The peripheral will set the value of the unsigned integer by sending an IIO Command, CMD_MENU_DATA, with the modifier, MOD_SET_ITEM, with a DDE string that contains the id of the element to be set and its value.

| DDE string sent by the peripheral | id=<hex number>, value=<unsigned number> |
|---|---|

Signed Integers (sint32)

Signed integers are useful for negative numbers.

| Keyword | Data type and printf format | Range and comments |
|---|---|---|
| value | SINT32, "%d" e.g. value=−5 | Card supplies value such that $-2^{16} <=$ value $<= 2^{16} - 1$, and min $<=$ value $<=$ max. For negative values the peripheral must display |

-continued

| Keyword | Data type and printf format | Range and comments |
|---|---|---|
| | | the value with a minus sign. For values greater than 100, the peripheral determines whether and how to display the radix depending on the current localization (e.g. "1000" for neutral or "1,000" for U.S. or "1.000" for Europe). |
| min | SINT32, "%d" e.g. min=−10 | Card supplies min such that $-2^{16}$ <=min <= $2^{16}$ - 1, and min <= max. |
| max | SINT32, "%d" e.g. max=+10 | Card supplies max such that $-2^{16}$ <=max <= $2^{16}$ - 1, and min <= max. |
| large-step | UINT32, "%d" e.g. large-step=10 | [ See uint32 type ] |
| sign | UINT32, "%d" e.g. sign=1 | Card supplies sign flag such that 1 = yes to include a sign symbol, and 0 = no to omit a sign symbol. The sign symbol is ASCII code 43 ("+") for positive sign and ASCII code 45 ("−") for negative sign. Regardless of sign specification, the peripheral must always display the negative sign symbol when the value being displayed is less than zero. So the significance of this sign specification is whether to display the positive sign symbol when the value is strictly positive. When the card supplies value=0 with sign=1, the peripheral does not display the positive sign symbol. The default is sign = 0 (no sign symbol). Peripherals may choose to ignore this option. |
| percent | UINT32, "%d" e.g. percent=0 | [ See uint32 type ] |

The peripheral will set the value of the signed integer by sending an IIO command CMD_MENU_DATA, with the modifier, MOD_SET_ITEM, with a DDE string that contains the id of the element to be set and its value.

| DDE string sent by the peripheral | id=<hex number>, value=<signed number> |
|---|---|

IP Addresses (ipaddr)

IP addresses are useful for identifying nodes, stations, hosts, devices, etc., on a network or on the Internet.

| Keyword | Data type and printf format | Range and comments |
|---|---|---|
| value | UCHAR (x 4) "%u.%u.%u.%u" e.g. value= 15.8.26.163 value= 015.008.026.163 | Card supplies text containing all four octets of the IP address, and each octet is an unsigned 8-bit number. Network byte order is not an issue here because the card and peripheral exchange strings that depict the order of the octets. All combinations are allowed upon data entry. The card verifies each entry for validity. So, the peripheral must allow the user to enter "0.0.0.0" for an IP address. The peripheral must then give that over to the card. The card decides whether the entry is valid for the menu item at hand. The ipaddr type is useful for any address that resembles its format: IP address, subnet mask, etc. |

The peripheral will set the value of the ip address by sending an IIO command, CMD_MENU_DATA, with the modifier, MOD_SET_ELEMENT, with a DDE string that contains the id of the element to be set and its value in unsigned dot notation.

| DDE string sent by the peripheral | id=<hex number>, value=<ip address in unsigned dot notation> |
|---|---|

Selections (Selection)

Selections are useful for showing the user the options relevant for the menu item at hand. The user selects the best answer from that set of relevant options. Typically peripherals will "lookup" the strings for all the possible index values between the mm and the max and present these strings as choices to the user.

| Keyword | Data type and printf format | Range and comments |
|---|---|---|
| value | PUCHAR, "%s" | Card supplies text as a quotized string of localized text. This text corresponds to the string that is represented by the current index. |
| index | UCHAR, "%d" | The numeric index that corresponds to the currently selected value. This value must be a positive integer in the range between the min and the max listed below. |
| min | UCHAR, "%d" | The minimum value that the index value can take. This must be a positive number greater or equal to zero. |
| max | UCHAR, "%d" | The maximum value that the index value can take. This must be a positive number greater or equal to zero. |

The peripheral will query the value strings for the selections with the IIO command MOD_LOOKUP_SELECTION, with a DDE string that contains the id of the selection element and the index value to query.

| DDE string sent by the peripheral | id=<hex number>, index=<selection> |
|---|---|

The peripheral will set the value selections by sending an IIO command, MOD_SET_SELECTION, with a DDE string that contains the id of the selection element to be set and the index value.

| DDE string sent by the peripheral | id=<hex number>, index=<selection> |
|---|---|

Real Numbers (real32)

Real numbers are useful for statistics, thresholds, set points, offsets, or any numbers that map to physical space rather than logical space. They are also useful for currency. This DDE string type is only available with alphanumeric enhanced and alphanumeric flex menus.

| Keyword | Data type and printf format | Range and comments |
|---|---|---|
| value | FLOAT32, "%f" e.g. value=92.5 | Card supplies the value of the real number such that its absolute value is within range: 0.0001 <= abs (value) <= 100000.0 The maximum integer part of the real number is one hundred thousand. The maximum fractional part of the real number is one ten thousandth (1/10,000), which is 4 decimal places. Peripherals only have to support 6 digits for the integer part, 1 character for the radix, 4 digits for the fractional part, and 1 character for a sign (+/−) symbol. So the maximum character length for a real number is 12 characters. When interfacing with the user, the peripheral must display the lower radix according to the current localization (e.g. "92.5" or "92,5"). The peripheral may include or omit the upper radix from the display. If included in the display, the upper radix must be localized (e.g. "1,092.5" or "1.092,5"). When peripheral and card exchange strings, all real numbers in the float32 DDE string must in fixed-point format (not scientific or exponential format). They must include a period for the lower radix and they must omit the upper radix. Keywords and numeric values in DDE strings are not localized. |
| min | FLOAT32, "%f" e.g. min=0.0 | Card supplies min such that: −100000.0 <= min <= value <= max |
| max | FLOAT32, "%f" e.g. max=100.0 | Card supplies max such that: min <= value <= max <= +100000.0 |
| precision | UINT32, "%d" e.g. precision=1 precision=2 | Card supplies precision such that 1 <= precision <= 4 to indicate the number of decimal places to display to the user. The peripheral must always show the specified number of decimal places, even if the fractional part of the real number is zero (e.g. 76.0). Precision must be consistent with value, min, max, single-step, and large-step attributes. So, if single-step=0.25 then precision must be greater than or equal to 2. Precision of 0 is not allowed - use the sint32 type for numbers that have zero precision. The precision attribute is required in all float32 DDE strings. |
| single-step | FLOAT32, "%f" e.g. single-step=0.1 single-step=0.25 single-step=1.0 | Card supplies single-step for the incremental resolution of the number. This is used to indicate how far to increment and decrement in single steps. The default is single-step=0.1 (one tenth). |
| large-step | FLOAT32, "%f" e.g. large-step= 0000.5000 | [See uint32 type] |
| sign | UINT32, "%d" e.g. sign=0 | [See signed integer type -- sint32 type] |
| percent | UINT32, "%d" e.g. percent=1 | [See uint32 type] |

The peripheral will set the value of the real number by sending an IIO Command, MOD_SET_ELEMENT, with a DDE string that contains the id of the element to be set and the value of the real number.

| | |
|---|---|
| DDE string sent by the peripheral | id=<hex number>, value=<real number> |

User Text (User)

User text is useful for capturing names, personal identification numbers, passwords, web addresses, e-mail addresses, and so on, from the user. The user text allowed is limited by the text class or by the filter. This string type is only available with alphanumeric enhanced and alphanumeric flex menus.

| Keyword | Data type and printf format | Range and comments |
|---|---|---|
| value | PUCHAR, "%s" | Card supplies text as a quotized string of localized text. |
| max-length | UCHAR, "%d" | Card supplies max-length of 0 to 255. The length does not include the null terminator. This is the maximum number of characters that the card will accept as input for user text. |
| allow | PUCHAR, "%s" Examples: allow="0-9a-zA-Z" allow=="-+a-z^%$" | Card supplies allow keyword to instruct the peripheral to allow only specific characters upon data entry; not compatible with class keyword or deny keyword. If no allow keyword is specified, no special restrictions are placed on user text. The filter is limited to ASCII values in the range 1-127 (\001 to \177 octal) that are printable. The default is that only printable characters are automatically allowed. |
| deny | PUCHAR, "%s" Examples: deny="0-9a-zA-Z" deny="-+a-z^%$" | Card supplies deny keyword to instruct the peripheral to deny only specific characters upon data entry; not compatible with class keyword or allow keyword. If no deny keyword is specified, no special restrictions are placed on user text. The filter is limited to ASCII values in the range 1-127 (\001 to \177 octal) that are printable. The default is that all non-printable characters are automatically denied. |

The peripheral will set the value of the user strings by sending an IIO command MOD_SET_ELEMENT, with a DDE string that contains the id of the element to be set and the value string.

| | |
|---|---|
| DDE string sent by the peripheral | id=<hex number>, value="<localized text>" |

What is claimed is:

1. A method for exporting menu objects to a peripheral in text form from a device, comprising:
   collecting from the peripheral configuration data including a value of at least one current setting of the peripheral;
   creating on the device a menu structure having at least one page, each page having at least one element, each element including a string adapted to store a value of a setting for the element, the string further including an element identifier unique to the page and an element type indicative of a format of the setting;

storing the collected configuration data into the string of at least one corresponding element of the menu structure on the device;

receiving at the device a request from the peripheral for an element in the menu structure;

sending the string for the requested element from the device to the peripheral, the string for the requested element including at least a portion of the stored configuration data; and displaying on the peripheral at least a portion of the menu structure, the portion including the requested element.

2. The method according to claim 1 further comprising the step of creating a menu session to said step of collecting configuration data.

3. The method according to claim 1, further comprising the steps of:

setting one of the pages as a current page;

loading the current page; and, waiting for a user response.

4. The method according to claim 3 wherein said step of loading the current page further comprises the steps of:

returning a string of a title of the current page;

setting a first element to a current element of the current page; and, returning a string of the current element.

5. The method according to claim 4 further comprises the steps of:

returning a status of a next element to the peripheral;

determining whether there is a selection element requested;

if there is a selection element requested, returning a string of the selection;

determining whether there are more selections;

if there are more selections, repeating from said step of returning a string of the selection;

if the there is no selection element requested or there are no more selections, determining whether there is a next element in the current page;

if there is a next element in the current page, setting the next element as the current element of the current page and repeating from said step of returning a string of the current element;

if there is not a next element in the current page, displaying at least one element using the returned string of the current page.

6. The method according to claim 3 wherein said step of waiting for a user response further comprises the steps of:

determining whether there is a user response to set an element in the current page;

if there is a user response to set an element in the current page, determining whether the user response is to set an item or to set a selection; and, if there is not a user response to set an element in the current page, determining whether the user response is to go to the menu or the page.

7. The method according to claim 6 wherein said step of determining whether the user response is to set an item or a selection further comprises the steps of:

if the user response is to set an item, determining whether the data for the item is valid;

if the user response is to set a selection, determining whether the data for the selection is valid;

if the data is valid, saving the data for the current element to memory and repeating from said step of loading the current page;

if the data is invalid, repeating from said step of waiting for a user response.

8. The method according to claim 6 wherein said step of determining whether the user response is to go to the menu or the page further comprises the steps of:

if the user response is to go to a new page, changing to the new page;

determining whether the new page is beyond the root page;

if the new page is beyond the root page, repeating from said step of loading the current page; and, if the new page is not beyond the root page or the user response is to go to the menu, determining whether the user response is to end or to cancel the session.

9. The method according to claim 8 wherein said step of changing to the new page further comprises the steps of:

determining whether there is a user response to exit the current page or to set the new page;

if there is a user response to exit the current page, determining whether the current page is the root page;

if there is a user response to set a new page, setting the new page as the current page;

if the current page is not the root page, setting a parent page as the current page; and, if the current page is the root page, responding with a status of the current page.

10. The method according to claim 9 wherein said step of setting the new page to the current page further comprises the step of responding with a status of the current page.

11. The method according to claim 8 wherein said step of determining whether the user response is to end or to cancel the session further comprises the steps of:

if the user response is to end the menu session, saving data to memory;

if the user response is to cancel the menu session, discarding data from memory; and, ending the menu session.

12. The method of claim 1, wherein the device has a microprocessor, a memory, and an interface chip.

13. A device for exporting menu objects of a menu to a peripheral in text form, comprising:

a structure in the device configured to define at least one page of a menu for display on the peripheral, the page having at least one element that defines a menu object, the structure adapted to store a current setting of the peripheral in a string of the at least one element, the string further including an element identifier unique to the page and an element type indicative of a format of the setting;

wherein the peripheral is configured to send to the device a plurality of commands for control of the menu objects and configuration data including a value of at least one current setting of the peripheral; and, wherein the device is configured to respond to said plurality of commands from the peripheral and to store the configuration data into the string of at least one corresponding element of the structure.

14. The device of claim 13, wherein said plurality of commands can be any one from the group consisting of:

a Mod_Start_Session command for starting a new menu session;

a Mod_End_Session command for ending and saving a currently active menu session;

a Mod_Cancel_Session command for canceling without saving a currently active menu session;

a Mod_Set_First_Page command for setting the root page of a currently active menu session;

a Mod_Set_New_Page command for setting a new page in the menu;

a Mod_Exit_Current_Page command for exiting a currently set page;
a Mod_Get_First_Element command for getting a first element in the currently set page;
a Mod_Get_Next_Element command for getting a next element in the currently set page;
a Mod_Get_Prev_Element element for getting a previous element in the currently set page;
a Mod_Set_Selection command for getting a selection selected by the user;
a Mod_Lookup_Selection command for looking up a currently set selection;
a Mod_Set_Item command for setting an item selected by the user; and,
a Mod_Get_Page_Title command for getting a title of a currently set page.

15. A device for exporting menu objects of a menu to a peripheral in text form, comprising:
means for providing a structure in the device configured to define at least one page of a menu for display on the peripheral, the page having at least one element that defines a menu object, the structure adapted to store a value of a current setting of the peripheral in a direct data entry string of the at least one element, the string further including an element identifier unique to the page and an element type indicative of a format of the setting;
means for receiving from the peripheral a plurality of commands for control of the menu objects and configuration data including at least one current setting of the peripheral;
means for responding to said plurality of commands from the peripheral; and
means for storing the configuration data into the string of at least one corresponding element of the structure.

16. A program product comprising a computer storage medium having computer-readable program codes embodied in the medium that when executed cause a device to:
collect from a peripheral configuration data of at least one current setting of the peripheral;
create on the device a menu structure having at least one page, each page having at least one element, each element including a string adapted to store a value of a setting for the element, the string further including an element identifier unique to the page and an element type indicative of a format of the setting;
store the collected configuration data into the direct data entry string of at least one corresponding element of the menu structure;
receive at the device a request from the peripheral for an element in the menu structure; and,
send the string for the requested element from the device to the peripheral for use in forming a display of at least a portion of the menu structure on the peripheral, the string for the requested element including at least a portion of the stored configuration data.

* * * * *

UNITED STATES PATENT AND TRADEMARK OFFICE
CERTIFICATE OF CORRECTION

PATENT NO. : 7,640,504 B2 Page 1 of 1
APPLICATION NO. : 10/127242
DATED : December 29, 2009
INVENTOR(S) : Martin D. Harris et al.

It is certified that error appears in the above-identified patent and that said Letters Patent is hereby corrected as shown below:

In column 17, line 13, in Claim 2, after "session" insert -- prior --.

In column 17, line 36, in Claim 5, delete "if the" and insert -- if --, therefor.

In column 18, line 6, in Claim 8, delete "beyond the" and insert -- beyond a --, therefor.

In column 19, line 15, in Claim 14, delete "of a" and insert -- of the --, therefor.

Signed and Sealed this

Thirteenth Day of April, 2010

David J. Kappos
*Director of the United States Patent and Trademark Office*